United States Patent
Ramesh et al.

(10) Patent No.: US 11,828,677 B2
(45) Date of Patent: Nov. 28, 2023

(54) CLOUD COMPUTING-BASED VEHICLE FLEET BENCHMARKING

(71) Applicant: PACCAR Inc, Bellevue, WA (US)

(72) Inventors: Varun Ramesh, Bellingham, WA (US); Carl Hergart, Bellingham, WA (US); Cynthia Chaffin Webb, Sedro-Woolley, WA (US); Jorge Rafael Lozada Ramirez, Cerrada del Sol (MX)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 17/239,119

(22) Filed: Apr. 23, 2021

(65) Prior Publication Data

US 2021/0333171 A1    Oct. 28, 2021

Related U.S. Application Data

(60) Provisional application No. 63/015,551, filed on Apr. 25, 2020.

(51) Int. Cl.
*G07C 5/00* (2006.01)
*G01M 17/007* (2006.01)
*G06Q 10/06* (2023.01)
*G06Q 30/0601* (2023.01)

(52) U.S. Cl.
CPC .......... *G01M 17/007* (2013.01); *G06Q 10/06* (2013.01); *G06Q 30/0631* (2013.01); *G07C 5/008* (2013.01)

(58) Field of Classification Search
CPC . G01M 17/007; G06Q 10/06; G06Q 30/0631; G07C 5/008
See application file for complete search history.

(56) References Cited

U.S. PATENT DOCUMENTS

| | | |
|---|---|---|
| 10,928,277 B1 | 2/2021 | Siddique et al. |
| 2006/0047419 A1* | 3/2006 | Diendorf ................ G06Q 10/08 340/552 |

(Continued)

FOREIGN PATENT DOCUMENTS

WO    2020/228949    11/2020

OTHER PUBLICATIONS

European Extended Search Report in Application 21170532.2, dated Sep. 27, 2021, 8 pages.

(Continued)

*Primary Examiner* — Chris Parry
*Assistant Examiner* — Hassan A Khan
(74) *Attorney, Agent, or Firm* — Merchant & Gould P.C.

(57) ABSTRACT

Aspects of systems, method, and computer-readable storage media are described herein that are configured to provide operator fleet performance benchmarking and analytics. A fleet analytics system may include user-friendly front end client application with which a non-technical user may interface, and a back end analytics and visualization system that is deployed on the cloud and offered as a service to determine a subset of 'like operators' to utilize as a baseline in a benchmark analysis, to benchmark a target operator's performance against the subset of like operators, determine analytics resulting from the benchmark analysis, and to generate visualizations of the analytics for display to the user/operator.

19 Claims, 10 Drawing Sheets

(56) References Cited

U.S. PATENT DOCUMENTS

| | | | | |
|---|---|---|---|---|
| 2007/0027593 | A1* | 2/2007 | Shah | B60W 50/00 |
| | | | | 702/33 |
| 2012/0162265 | A1* | 6/2012 | Heinrich | G06F 3/04883 |
| | | | | 345/173 |
| 2012/0256770 | A1* | 10/2012 | Mitchell | G08G 1/127 |
| | | | | 340/989 |
| 2013/0079970 | A1* | 3/2013 | Raghunathan | G06Q 10/10 |
| | | | | 701/29.3 |
| 2013/0104064 | A1* | 4/2013 | McCormick | G06F 40/106 |
| | | | | 715/765 |
| 2015/0193994 | A1* | 7/2015 | McQuade | G07C 5/008 |
| | | | | 701/29.3 |
| 2016/0078576 | A1* | 3/2016 | Su | G06Q 10/0631 |
| | | | | 705/7.12 |
| 2016/0086391 | A1* | 3/2016 | Ricci | G06Q 30/06 |
| | | | | 701/29.3 |
| 2017/0057411 | A1* | 3/2017 | Heath | G08G 1/0112 |
| 2017/0113664 | A1* | 4/2017 | Nix | G08B 13/19669 |
| 2018/0158145 | A1* | 6/2018 | Weigel | G06Q 40/06 |
| 2019/0082287 | A1* | 3/2019 | Froehlich | H04W 4/02 |
| 2019/0279440 | A1* | 9/2019 | Ricci | H04W 4/48 |
| 2019/0318248 | A1* | 10/2019 | Moreira-Matias | G06N 20/20 |
| 2019/0340543 | A1* | 11/2019 | Gerenstein | G08G 1/202 |
| 2020/0019926 | A1* | 1/2020 | Ayoub | H04W 4/40 |
| 2020/0033147 | A1* | 1/2020 | Ahn | G05D 1/0276 |
| 2020/0273268 | A1* | 8/2020 | Bhattacharyya | |
| | | | | G06Q 10/06315 |
| 2021/0248641 | A1* | 8/2021 | Chan | G07C 5/08 |
| 2021/0334727 | A1* | 10/2021 | Ramesh | G06Q 30/0631 |

OTHER PUBLICATIONS

European Extended Search Report in Application 22169605.7, dated Sep. 20, 2022, 10 pages.

* cited by examiner

CLOUD COMPUTING-BASED VEHICLE FLEET BENCHMARKING

CROSS-REFERENCE TO RELATED APPLICATIONS

This application claims the benefit of U.S. Provisional Application No. 63/015,551, having the title of "CLOUD COMPUTING-BASED VEHICLE FLEET BENCHMARKING" and the filing date of Apr. 25, 2020, which application is hereby incorporated herein by reference in its entirety.

BACKGROUND

In the heavy-duty trucking industry, a successful selling of a vehicle to an operator is not the end of the deal, but the beginning of a relationship. As is most often the case, every truck operator is, in turn, an organization with unique operations relying on a movement of freight for revenue. Therefore, a successful model for a commercial trucking original equipment manufacturer (OEM) may include robust aftersales support for providing the operator with information for understanding problems with a vehicle that may be unique to the operator's needs. As can be appreciated, giving this high level of attention to every operator may require a large investment of computing resources from the OEM to monitor operator operations and to be able to anticipate problems before they occur.

Moreover, benchmarking is a useful tool for evaluating or checking how a target operator is performing by comparison of the operator's performance metrics against a baseline.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing operator fleet performance benchmarking and analytics. A fleet analytics system described herein is designed to be easy to deploy as a lightweight, easy to use cloud-based service to a non-technical audience. Aspects of the fleet analytics system utilize a telematics system to collect and store real-time data from vehicles, a cloud-computing system to provide a service that can be used by various types of users (e.g., operators, dealers, etc.) and that has sufficient complexity to analyze telemetry data and benchmark a target operator, determine analytics associated with the target operator's performance against a baseline, and generate visualizations for communicating the analytics in a clear manner from which the target operator is able to draw technical insights. Currently, since each operator operation is unique, there is a need for a baseline for a given operation to compare a target operator's performance against. For example, by comparing a target operator's performance against a baseline for a given operation, insights and potential problems may be identified, which may enable the target operator to make changes with an aim of increasing an aspect of performance (such as fuel efficiency) and thus be more competitive. According to an aspect, the fleet analytics system may be configured to determine a baseline based on one or more operators who are determined to meet a similarity (to the target operator) threshold according to an analysis of data defining how the target operator operates.

In a first aspect, a system for providing operator fleet performance benchmarking and analytics is provided. In an example embodiment, the system comprises at least one processor, a memory storage device including instructions that when executed by the at least one processor are configured to: obtain target operator vehicle configuration data and telemetry data associated with a target operator vehicle fleet; determine, based on the target operator vehicle configuration data and telemetry data, an operator-like-me profile including target operator operation values representing attributes of the target operator vehicle fleet; determine, based on the target operator operation values, a subset of operators satisfying criteria associated with the operator-like-me profile; obtain other operator vehicle configuration data and telemetry data associated with the subset of operators; anonymize the other operator vehicle configuration data and telemetry data; determine target operator key performance indicator values for the target operator vehicle fleet based on the target operator vehicle configuration data and telemetry data; determine other operator key performance indicator values for the subset of operators based on the vehicle configuration data and telemetry data associated with the subset of operators; benchmark the target operator vehicle fleet's performance using the other operator key performance indicator values as a baseline; and generate visualizations that visually represent the target operator and other operator key performance indicator values and the results of the benchmark.

In another aspect, a method for providing operator fleet performance benchmarking and analytics is provided. In an example embodiment, the method comprises: obtaining target operator vehicle configuration data and telemetry data associated with a target operator vehicle fleet; determining, based on the target operator vehicle configuration data and telemetry data, an operator-like-me profile including target operator operation values representing attributes of the target operator vehicle fleet; determining, based on the target operator operation values, a subset of operators satisfying criteria associated with the operator-like-me profile; obtaining other operator vehicle configuration data and telemetry data associated with the subset of operators; anonymizing the other operator vehicle configuration data and telemetry data; determining target operator key performance indicator values for the target operator vehicle fleet based on the target operator vehicle configuration data and telemetry data; determining other operator key performance indicator values for the subset of operators based on the vehicle configuration data and telemetry data associated with the subset of operators; benchmarking the target operator vehicle fleet's performance using the other operator key performance indicator values as a baseline; and generating visualizations that visually represent the target operator and other operator key performance indicator values and the results of the benchmark.

In another aspect, a computer-readable storage device is provided, the computer-readable storage device including computer readable instructions, which when executed by a processing unit, are configured to: receive a request from a client application to initiate a benchmark a target operator vehicle fleet's performance against a baseline; obtain target operator vehicle configuration data and telemetry data associated with the target operator vehicle fleet; determine, based on the target operator vehicle configuration data and telemetry data, an operator-like-me profile including target operator operation values representing attributes of the target operator vehicle fleet; determine, based on the target operator operation values, a subset of operators satisfying criteria associated with the operator-like-me profile; obtain other operator vehicle configuration data and telemetry data associated with the subset of operators; anonymize the other operator vehicle configuration data and telemetry data; determine target operator key performance indicator values for the target operator vehicle fleet based on the target operator vehicle configuration data and telemetry data; determine other operator key performance indicator values for the subset of operators based on the vehicle configuration data and telemetry data associated with the subset of operators; benchmark the target operator vehicle fleet's performance using the other operator key performance indicator values as the baseline; generate visualizations that visually represent the target operator and other operator key performance indicator values and the results of the benchmark; and provide the visualizations to the client application for display in a graphical user interface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
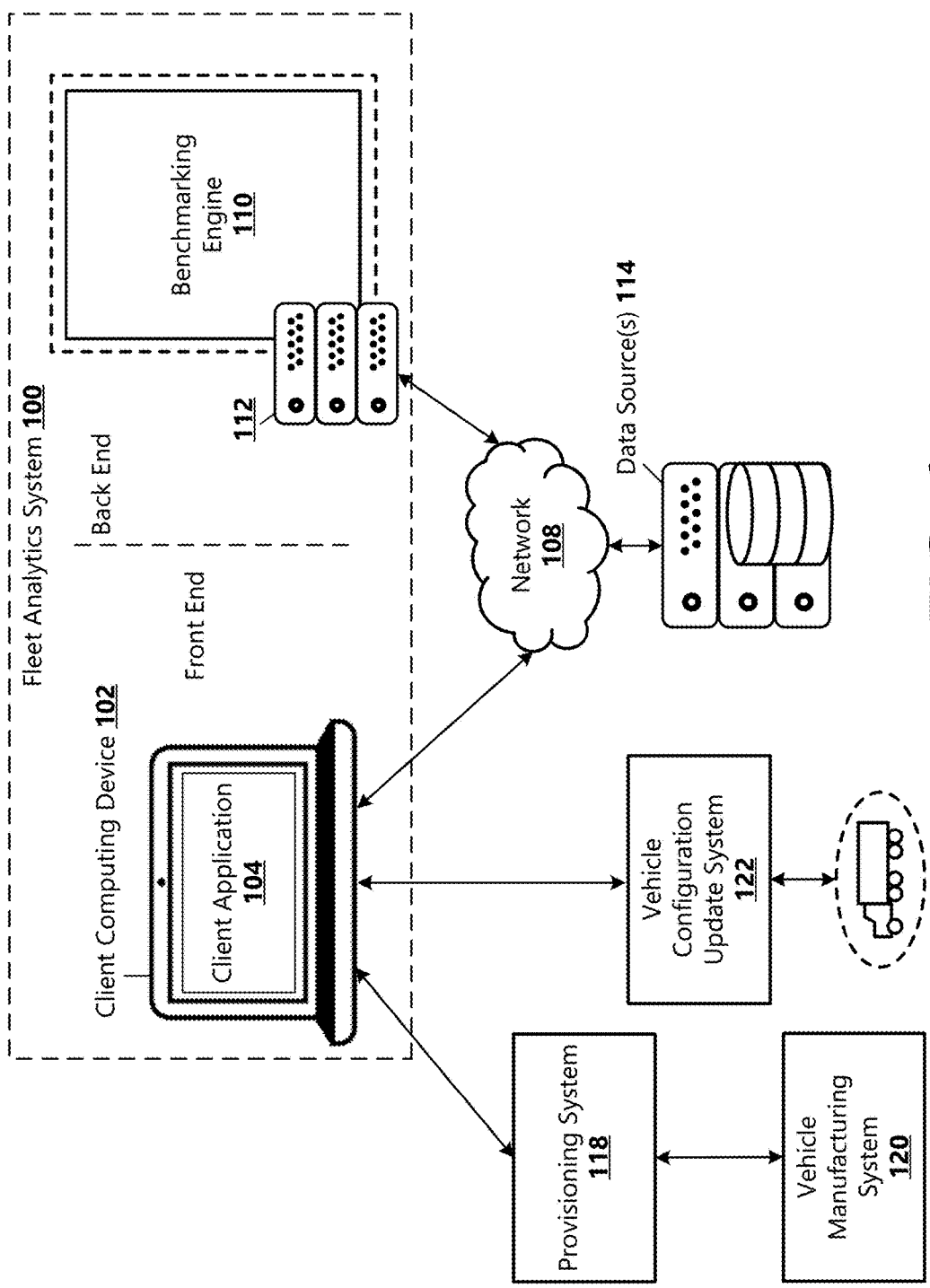
FIG. 1 is a block diagram of an example environment in which a fleet analytics system of the present disclosure can be implemented according to an embodiment.

Aspects of the present disclosure are generally directed to systems, methods and computer readable storage media for providing operator fleet performance benchmarking and analytics. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

FIG. 1 is a block diagram of an example environment 101 in which a fleet analytics system 100 of the present disclosure can be implemented. For example, the example environment 101 may include a client computing device 102, a network 108, a plurality of data sources 114, and one or more servers 112. Communications between the client computing device 102, the data sources 114, and the server(s) 112 are carried out over the network 108 using well-known network communication protocols. For example, the network 108 may be one or a wide area network (e.g., the Internet), a local area network, another type of network, or a combination thereof.

The client computing device 102 may be one or more of various types of computing devices (e.g., a server device, a desktop computer, a tablet computing device, a mobile device, a laptop computer, a laptop/tablet hybrid computing device, a large screen multi-touch display, or other type of computing device) configured to execute instructions for performing a variety of tasks. The hardware of these computing devices is discussed in greater detail in regard to FIG. 9. The client computing device 102 is shown to include a front-end client application 104. A user may use the client application 104 to input target operator information and/or obtain target operator information from a data source 114, and to initiate a request to a benchmarking engine operating on a server 112 for fleet performance benchmarking and analytics against a subset of operators like (e.g., similar to within a threshold) the target operator. For example, the user may be an existing operator of a dealer or manufacturer of vehicles or the dealer or manufacturer, and the fleet analytics system 100 may be used to provide a user-friendly front end client application 104 with which the user may interface, and a back end analytics and visualization system (i.e., the benchmarking engine 110) that is deployed on the cloud and offered as a service to determine a subset of like operators to utilize as a baseline, to benchmark a target operator's performance against the subset of like operators, determine analytics resulting from the benchmark analysis, and to generate visualizations of the analytics for display to the user/operator.

The client application 104 may be configured to provide requests (e.g., hypertext transfer protocol (HTTP) requests) to data sources 114 and servers 112 for requesting information stored on or accessible to, or determined by the data sources 114 and/or servers 112. In some examples, the client application 104 is a thick client application that is stored locally on the client computing device 102. In other examples, the client application 104 is a thin client application (e.g., a web application) that may reside on a remote server and be accessible over the network 108. For example, a thin client application can be hosted in a browser-controlled environment or coded in a browser-supported language and be reliant on a common web browser executing on the client computing device 102 to render the client application 104 executable on the device.

The data sources 114 may be or include any suitable data source or data storage server, unit or system, including any applicable applications, e.g., database management system (DBMS) applications, attached storage systems and the like. The data sources 114 are configured to execute instructions that provide information to the fleet analytics system 100. For example, a data source 114 may receive a request for stored data from the client computing device 102 and/or from back end modules of the fleet analytics system 100.

The server(s) 112 are illustrative of physical or virtual processing systems that are configured to execute instructions that analyze data and provide information to the client computing device 102 and in response to receiving requests from the client computing device 102. For example, the information may include Web pages, output of executables, raw data, or any other suitable type of information. In accordance with some example embodiments, the server(s) 112 are configured to host respective Web sites, so that the Web sites are accessible to users of the fleet analytics system 100. The server(s) 112 are shown to include a backend benchmarking engine 110. The benchmarking engine 110 is illustrative of a software module, system, or device that is operative or configured to determine a subset of operators whose operations are like/similar to a target operator's operations, to benchmark the target operator's performance against the subset of like operators, to determine analytics resulting from the benchmark analysis, and to generate visualizations of the analytics for display to the user/operator.

In some examples, the fleet analytics system 100 is operative or configured to determine a vehicle configuration based on the benchmark analysis. For example, a determined vehicle configuration may include powertrain specification options (e.g., engine type, a hardware/software transmission type, and an axle ratio), a software update, or other specification options and technologies that may be provisioned to a new vehicle to be manufactured or to an existing target operator's vehicle. In some examples, example environment 101 may include a provisioning system 118 and a vehicle manufacturing system 120. For example, the provisioning system 118 is illustrative of a software module, system, or device that is operative or configured to receive a vehicle configuration for a vehicle, as determined by the fleet analytics system 100, and communicate with the vehicle manufacturing system 120 for initiating manufacture of a new vehicle according to the vehicle configuration. In some examples, the provisioning system 118 may be operative to convert vehicle configuration options corresponding to the vehicle configuration (e.g., powertrain configurations, other vehicle configurations/options) into a format that can be utilized by the vehicle manufacturing system 120 to initiate manufacture of the vehicle. In some examples, the example environment 101 may include a vehicle configuration update system 122. For example, the vehicle configuration update system 122 is illustrative of a software module, system, or device that is operative or configured to receive a vehicle configuration for a vehicle, as determined by the fleet analytics system 100, and to automatically apply the vehicle configuration to one or more vehicles, e.g., using one or more over-the-air updates to a computing system of the vehicle to affect the operation of the vehicle. Example techniques for providing operator fleet performance benchmarking and analytics are discussed in greater detail below with reference to FIGS. 2-8.

Figure 2A:
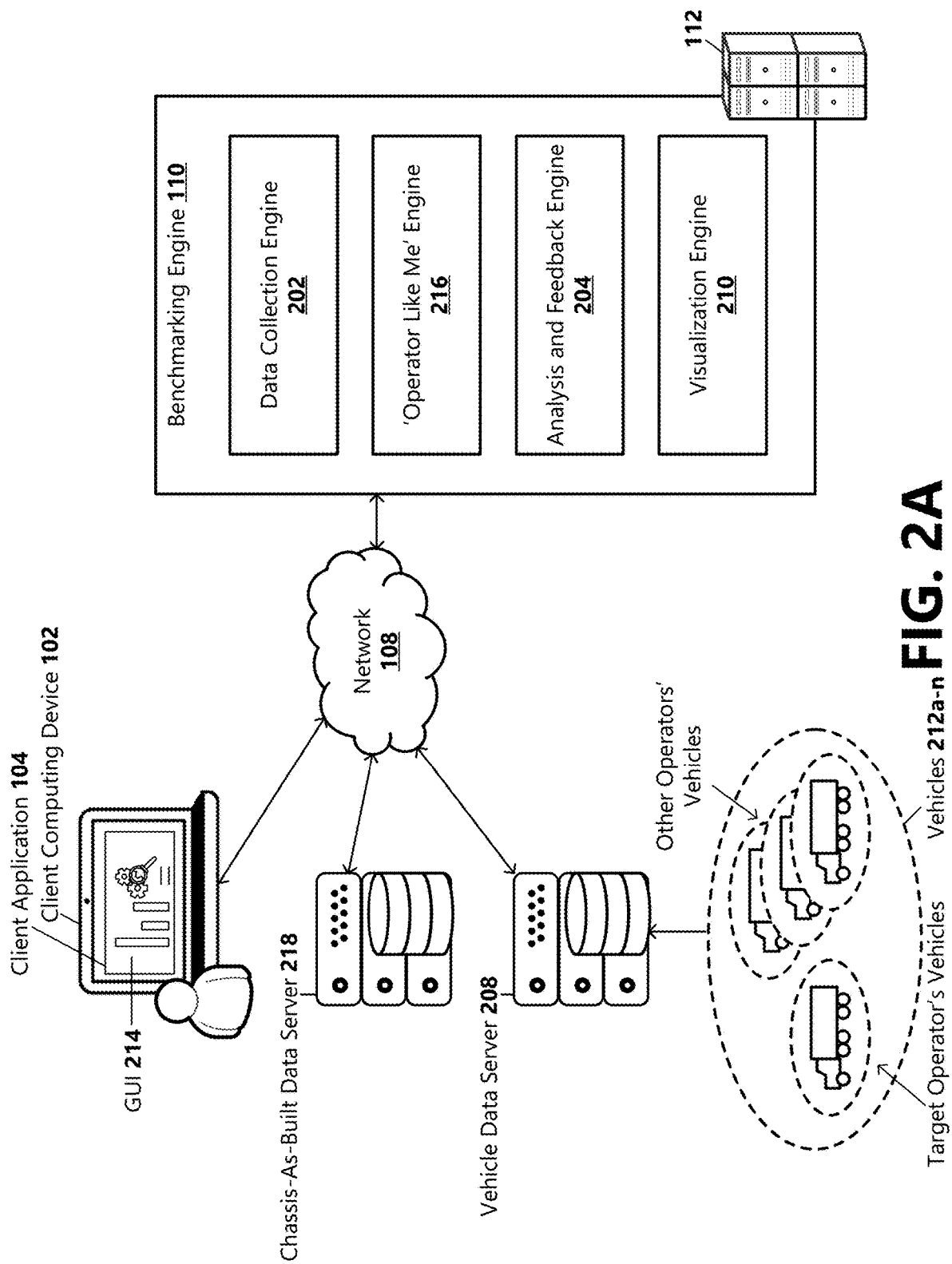
FIGS. 2A and 2B are a block diagrams illustrating components of the example fleet analytics system of FIG. 1.
Figure 2B:
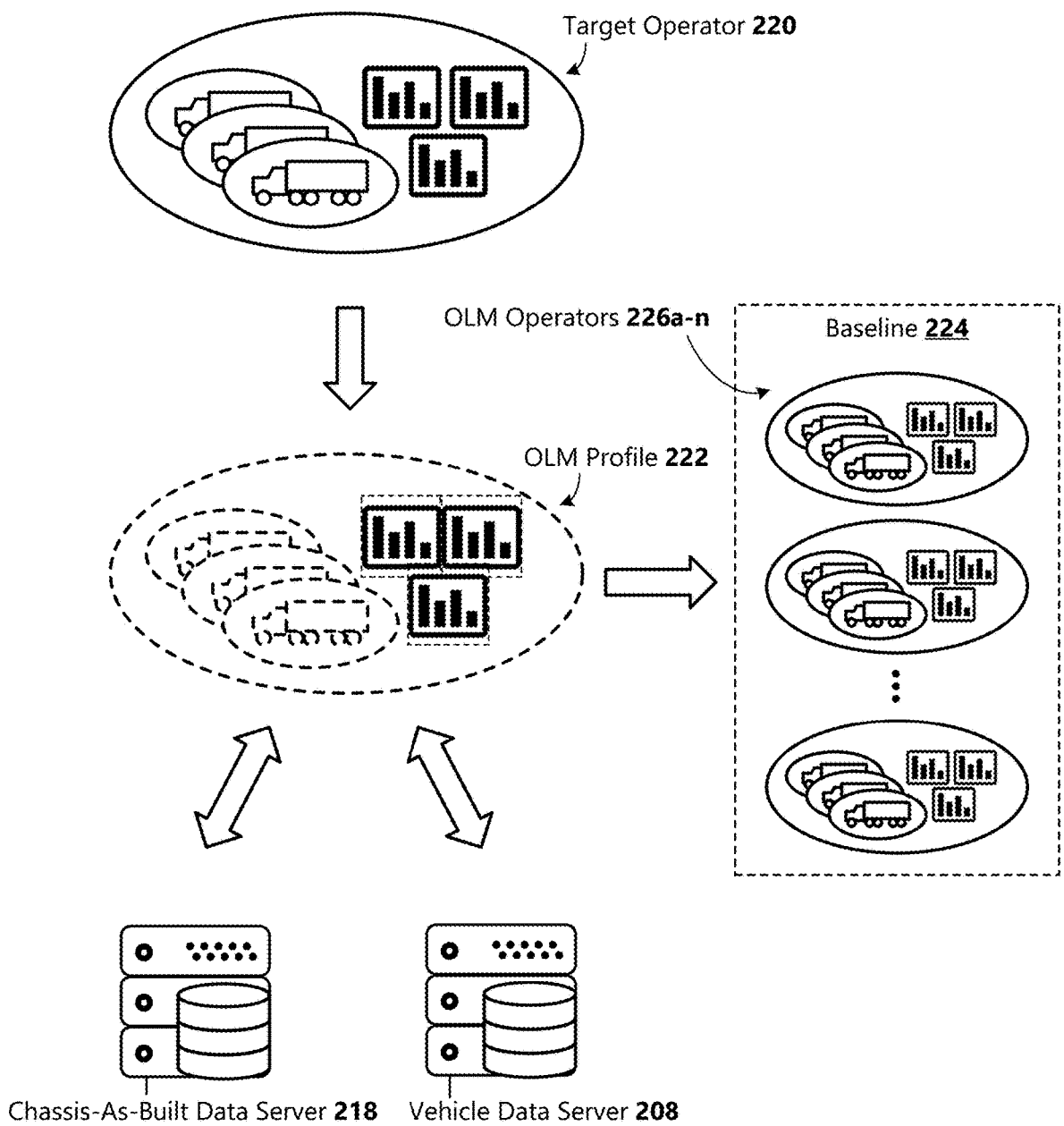

FIGS. 2A and 2B (collectively, FIG. 2) are a block diagram that illustrates components of an example fleet analytics system 100. A user may use the client application 104 to initiate a request for benchmark analytics from the benchmarking engine 110. According to examples, the client application 104 may provide a graphical user interface (GUI) 214 that allows the user to initiate the request for benchmark analytics associated with 'like operators' and to view a dashboard comprising analytics resulting from the benchmark analysis and other information, and to otherwise interact with functionalities of the fleet analytics system 100 through manipulation of graphical icons, visual indicators, and the like. As used herein, the term 'like operators' describes operators whose operations are similar to a target operator. For example, operator operations may be determined to be similar to a target operator's operations based on satisfying a set of criteria within a threshold, wherein the criteria include various operator data defining various attributes of the vehicle or fleet of vehicles. In examples, the various attributes may be associated with a vehicle's configuration (e.g., vehicle class, engine family, model), and drive and duty cycles (e.g., maximum speed (miles per hour (MPH)), average speed (MPH), horsepower utilization, cruise control usage (%), average trip distance (miles), load profile, typical route(s) (e.g., geo-location data), vehicle payload).

As part of using the client application 104 to initiate the request for benchmark analytics associated with like operators, the user may input operator information. For example, the operator information may include identifier information for the target operator that can be used to obtain data (e.g., vehicle configuration data and operational data, such as remote diagnostics and/or telemetry data) for the target operator. In some examples, the GUI 214 may include a webpage or an application interface visible to the user (e.g., the operator and/or a dealer). For example, the GUI 214 may be displayed on a screen included in or operatively connected to the client computing device 102. In some examples, the GUI 214 may be configured to utilize natural interface technologies that enable a user to interact with functions of the fleet analytics system 100 and data provided by the fleet analytics system 100 in a "natural" manner (e.g., methods that may rely on speech recognition, touch and stylus recognition, gesture recognition both on screen and adjacent to the screen, air gestures, head and eye tracking, voice and speech, vision, touch, hover, gestures).

According to an aspect and with reference still to FIG. 2A, the benchmarking engine 110 may include various components including a data collection engine 202, an 'operator like me' (OLM) engine 216, an analysis and feedback engine 204, and a visualization engine 210. As should be appreciated, while the various components are shown to be included in a common server 112 (or a common group of servers), the various components (or any respective combinations or portions thereof) may be included in separate servers (or respective groups of servers). The data collection engine 202 is illustrative of a software module, system, or device that is operative or configured to receive data from the client application 104, such as the request for benchmark analytics associated with like operators and associated operator information, and other data input and selected via the GUI 214, and to process selections made by the user. In some examples, the operator information comprises operator identifier information that can be used to retrieve various vehicle specification options from a data source 114 embodied as a Chassis-As-Built (CAB) data server 218. For example, the CAB data server 218 may be a static database configured to store data associated with how a vehicle 212 is configured at the time of build, which may include powertrain specification options (e.g., engine type, a hardware/software transmission type, and an axle ratio) and other specification options and technologies that may be offered for implementation in a vehicle configuration. The data collection engine 202 may be further configured to communicate with the CAB data server 218 for requesting vehicle configuration data for a target operator. In response to a query for vehicle configuration data (e.g., from the data collection engine), the CAB data server 218 may provide the requested vehicle configuration data to the data collection engine 202. According to an aspect, the data collection engine 202 may be further configured to anonymize the received vehicle configuration data.

The OLM engine 216 is illustrative of a software module, system, or device that is operative or configured to determine, for the target operator, a subset of operators whose operations are like/similar to a target operator's operations based on criteria that define the operations of the target operator. According to an aspect and as illustrated in FIG. 2B, as part of determining the subset of like operators, the OLM engine 216 may be configured to analyze the vehicle configuration data and telematics data associated with the target operator 220 for determining and defining an 'operator like me' virtual operator profile (herein referred to as an OLM profile 222) representing the target operator 220. In defining an OLM profile 222, various operation values may be determined for the OLM profile based on the target operator 220 data, wherein the operation values include values assigned to various criteria that define attributes of the target operator's vehicle's/fleet or vehicles' configuration, drive cycles, and duty cycles. Example, but non-limiting, operation values may include values for vehicle class, vehicle engine family, vehicle model, maximum speed (e.g., miles per hour (MPH), kilometers per hour (KPH)), average speed (e.g., MPH, KPH), horsepower utilization, cruise control usage (%), average trip distance (miles, kilometers), load profile, etc. As should be appreciated, operation values may be determined for and used to represent various other attributes associated with a vehicle 212 or a fleet of vehicles, and these other attributes and associated operation values are within the scope of the present disclosure. According to an aspect, the OLM profile 222 operation values may be used to query one or more data sources 114 (e.g., the CAB data server 218, a vehicle data server 208) for identifying a subset of operators who have similar operation values according to a threshold (herein referred to as OLM operators 226a-n (generally 226). According to an aspect, the OLM operators 226 may be operative as a baseline against which the target operator 220 can be benchmarked.

In some examples, an OLM profile 222 may be manually-input or manually-configurable by the user. For example, the user may input and/or adjust the OLM profile 222 operation values and threshold values based on the operator's preferences or desires, or to otherwise better represent the target operator 220. For example, the GUI 214 may include user interface controls that enable the user to input or adjust the OLM profile operation values and threshold values, wherein user inputs associated with adjustments to OLM profile 222 operation values and/or threshold values may be received by the data collector 202 and communicated with the OLM engine 216. Accordingly, the OLM profile 222 may be created or modified based on the inputs of/adjustments to OLM profile operation values and/or threshold values, and OLM operators 226 may be identified based on the created/modified OLM profile 222.

In other examples, defining the OLM profile 222 and the identification of clusters of OLM operators 226a-n may effectively be performed by an unsupervised machine learning algorithm using feature selection and principal component analysis to build the OLM profile operation values and identify clusters of OLM operators 226a-n for a given target operator 220. Among other things, the unsupervised machine learning algorithm can determine similarities between operators based on all information available in vehicle data server 208 rather than the discrete variables made available to define an OLM within the client application 104. As information about the target operator 220 and other operators is continuously received/updated in vehicle data server 208, such an unsupervised learning algorithm may be run continuously in the background, while visual display of results for a particular target operator 220 may be displayed only when requested.

The vehicle data server 208 may be a real-time database operative or configured to collect and store operational data, such as telematics data, from a population of operators' vehicles 212a-n (generally 212). In examples, the operational/telematics data may be retrieved via wireless transmission of such to vehicle data server 208 while the vehicle (s) operate. In some examples, the operational/telematics data may be too large to be conveniently transmitted during operation and may be retrieved via wired, wireless, or other communications means when the vehicle(s) is/are present at a dealer or operator-care site (e.g., by reading such data from disk or other tangible storage means provided in the vehicle (s)). The collected and stored telematics data can include, for example, trip data, faults snapshot data, location and ambient conditions data, drive cycle data (e.g., speed (maximum, average), throttle, idle, power take off (PTO), cruise), various performance variables, fuel consumption data, and other that may be sensed by a vehicle's onboard sensors and sent to, received by, and stored on the vehicle data server 208. For example, telemetry data and other diagnostics data captured during normal real-world vehicle operation, such as that collected and stored by the vehicle data server 208, may provide an accurate characterization of vehicle usage and performance, and are therefore advantageous for use in determining how well a vehicle 212 or fleet of vehicles 212 may be performing in comparison against a baseline 224. Techniques for determining how well a target operator 220 (e.g., target operator's vehicle 212 or fleet of vehicles) may be performing are described below.

The telemetry data may be collected using various technologies, such as via a dedicated onboard vehicle tracking device installed in a vehicle 212 that allows the sending, receiving and/or storing of telemetry data. In some examples, the device may be configured to connect via the vehicle's onboard diagnostics (ODBII), CAN (Controller Area Network) bus port, or other technology with a SIM card, and an onboard modem may enable communication through a wireless network 108. In some examples, the telemetry data may be transmitted via GPRS (General Packet Radio Service), a mobile data and cellular network, or satellite communication to the vehicle data server 208. In other examples, the operational/telematics data may be too large to be conveniently transmitted during operation and may be retrieved via wired, wireless, or other communications means when the vehicle(s) is/are present at a dealer or operator-care site (e.g., by reading such data from disk or other tangible storage means provided in the vehicle(s)). In some examples, the vehicle data server 208 may be configured to process and convert the collected telemetry data into a database of telemetry data, where the data are stored and can be accessed by data requesters, such as the benchmarking engine 110 and, in some examples, the client application 104. As should be appreciated, while the vehicle data server 208 and the CAB data server 218 are shown to be included in separate servers 112 (or respective groups of servers), in other examples, the vehicle data server 208 and the CAB data server 218 may be included in a common server 112.

In example aspects, the benchmarking engine 110 may use the data collector 202 to query one or more data sources 114, such as the CAB data server 218 and the vehicle data server 208 for operators having telemetry data matching the OLM operation values according to the threshold values. In some examples, the data collector 202 may request a query of telemetics data for a specific time period (e.g., current, 2 months, 1 year, 2 years). In some examples, the data collector 202 may use an application programming interface (API) for querying and obtaining telematics data and vehicle configuration data from the vehicle data server 208 and CAB data server 218, respectively. Query results including telematics data and vehicle configuration data of the OLM operators 226 may be received by the data collector 202, anonymized, and provided to the analysis and feedback engine 204.

According to an aspect, the analysis and feedback engine 204 is illustrative of a software module, system, or device that is operative or configured to analyze (e.g., perform calculations on) the target operator's 220 telemetry data and the telemetry data of the OLM operators 226 (i.e., subset of operators matching the OLM operation values according to the threshold values) for determining key performance indicators (KPIs) that can be evaluated for determining how the target operator 220 may be performing in comparison against a baseline 224. In some examples, the KPIs may be evaluated for determining transportation system efficiency. For example, example KPIs that may be indicative of how a target operator 220 (i.e., a target operator's vehicle 212 or fleet of vehicles) may be comparatively performing may include, but are not limited to, fuel economy, software status, uptime, gradeability, acceleration, freight efficiency, maintenance compliance, or other transportation system efficiency attribute metrics. In some examples, KPIs may additionally include performance measurements associated with the driver(s) of the vehicle(s) 212.

A determination of how a target operator 220 may be comparatively performing may further include benchmarking the KPIs of the target operator 220 against the KPIs determined for the OLM operators 226 and determining benchmarking results including KPI values and associated metrics and differences in KPI values. For example, the differences in values between the KPIs of the target operator 220 and the OLM operators 226 may be indicative of comparative performance, wherein target operator 220 KPI values that are lower than baseline 224 KPI values may indicate lower performance, target operator 220 KPI values that are higher than baseline 224 KPI values may indicate higher performance, and target operator 220 KPI values that are approximate to baseline 224 KPI values may indicate average performance. For example, benchmarking results may be used to identify underperforming vehicles 212, identify vehicle drivers who may need coaching/instruction, and identify how the target operator 220 compares against other operators in a same category. In examples, the target operator may comprise an owner of a fleet of vehicles, and the comparison to "operators-like-me" may comprise a comparison against an owner of a similar fleet.

In some examples, benchmarking results can be used to determine a vehicle configuration for a target operator vehicle 212 that may increase performance (e.g., improve KPIs) of the vehicle or the operator's fleet. For example, the vehicle configuration may be associated with a vehicle configuration for a new vehicle 212 for a target operator or may be associated with updates to an existing target operator vehicle 212. The vehicle configuration may be based on a vehicle configuration of an OLM operator 226 that may have KPI values that indicate better performance than a vehicle 212 of the target operator 220. One example vehicle configuration may include powertrain specification options (e.g., engine type, a hardware/software transmission type, and an axle ratio). Another example vehicle configuration may include a software update via one or more over-the-air updates to a vehicle computing system to affect operation of the vehicle. Other example vehicle configurations may include other specification options and technologies that may be offered for implementation of a new or pre-existing vehicle 212.

As mentioned above, in some examples, the fleet analytics system 100 may be operative or configured to automatically apply a vehicle configuration. In some examples, a vehicle configuration may be communicated to the provisioning system 118 for initiating manufacture of a vehicle 212 by the vehicle manufacturing system 120 according to the vehicle configuration. In other examples, a vehicle configuration may be communicated to the vehicle configuration update system 122 for automatically applying an update associated with the vehicle configuration (e.g., software update) to an existing target operator vehicle 212 via one or more over-the-air updates to a vehicle computing system to affect operation of the vehicle 212.

The visualization engine 206 is illustrative of a software module, system, or device that is operative or configured to generate and provide a dashboard UI to the client application 104 to be rendered in a GUI 214 and displayed by the client computing device 102. For example, the dashboard UI may include various visualizations representing the benchmarking results and anonymized datasets analyzed for determining the benchmarking results. In some examples, to visually represent benchmarking results, the visualization engine 206 may be configured to overlay datasets for visual comparison of value differences and/or relative target operator performance.

The user/operator may be enabled to view the various visualizations and interact with various options that may allow for a selection or determination of OLM operators 226, a time range of the telematics data, a state or other geographical region in which the telemetry data are taken, whether a visualization is shown on a unique vehicle identifier number (VIN) basis or a model basis, and other options. In some examples, the visualizations may visually indicate how and to what extent a target operator 220 is comparatively performing against a baseline 224 embodied as a subset of like operators (i.e., OLM operators 226).

In examples, the benchmarking engine 110 may operate on a cloud server 112 that is accessible to the client computing device 102, and the CAB data server 218 and vehicle data server 208 may operate in a cloud storage environment that is accessible to the benchmarking engine 110. According to an aspect, the benchmarking engine 110 may be scalable and may be periodically updated by an OEM. For example, the lightweight client application 104 may be instantiated on computing systems of an operator or dealer, and the benchmarking engine 110, CAB data server 218, and vehicle data server 208 may be instantiated on computing systems of a vehicle manufacturer, as the telematics and benchmarking analytics systems may be comparatively resource/storage-intensive. Moreover, aspects of the fleet analytics system 100 enable increased computing efficiency by creating the OLM profile 222, which can be used to identify OLM operators 226 and to compare against OLM operator data in a single step rather than using multiple servers and multiple round-trip data queries to determine target operator performance and associated vehicle configurations.

Figure 3:
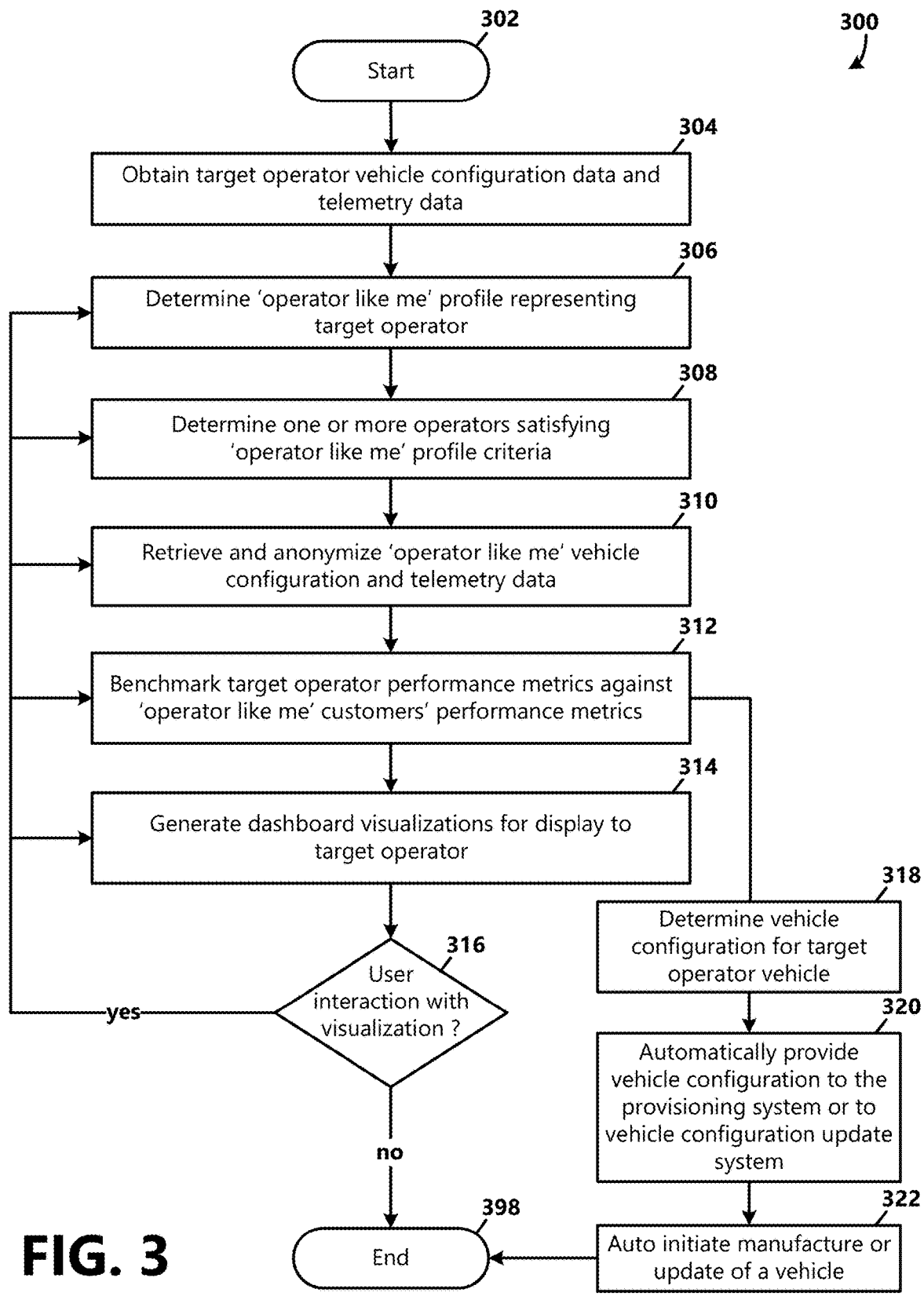
FIG. 3 is a flow diagram depicting general stages of an example process for providing operator fleet performance benchmarking and analytics.

FIG. 3 is a flow diagram depicting general stages of an example method 300 for providing operator fleet performance benchmarking and analytics. The method 300 starts at START OPERATION 302, where a user selection may be made to compare a target operator's performance against a subset of operators with like operations of the target operator, and an indication of the user selection and target operator information may be received. For example, the target operator information may include information about the target operator 220 that can be used to query data sources 114 for related data. The target operator information may be sent from a front-end client application 104 as part of a request for benchmarking and analytics results indicative of the target operator's performance in comparison against a baseline 224 of like operators.

At OPERATION 304, vehicle configuration data and telemetry data associated with the target operator 220 may be obtained. For example, the benchmarking engine 110 may be configured to query the CAB data server 218 and the vehicle data server 208 for vehicle configuration data and telemetry data, respectively, based on the operator information.

At OPERATION 306, an OLM profile 222 representing the target operator 220 may be determined. For example, the OLM profile 222 may include various operation values that define the operations of the target operator 220. The various operation values may be determined for the OLM profile 222 based on the target operator 220 data and may define attributes of the target operator's vehicle/fleet of vehicles configuration, drive cycles, and duty cycles. As discussed, the OLM profile 222 may be configurable/editable using the client application 104 and/or may be determined automatically based on already-stored information relating to an existing operator.

At OPERATION 308, one or more OLM operators 226 may be determined. For example, the OLM profile 222 operation values may be used to query one or more data sources 114 (e.g., the CAB data server 218, the vehicle data server 208) for identifying a subset of operators that have similar operation values according to one or more thresholds. As discussed, the profile criteria and thresholds for OLM operators 226 may be configurable/editable using the client application 104 and/or may be determined automatically. According to an aspect, the OLM operators 226 may be operative as a baseline against which the target operator 220 can be benchmarked.

At OPERATION 310, vehicle configuration data and telemetry data associated with the subset of operators (i.e., OLM operators 226) may be retrieved and anonymized. For example, the OLM operator 226 configuration data and telemetry data may be requested from and provided by the CAB data server 218 and vehicle data server 208, respectively.

At OPERATION 312, the target operator's 220 telemetry data and the telemetry data of the OLM operators 226 (i.e., subset of operator matching the OLM operation values according to the threshold values) may be analyzed for determining key performance indicators (KPIs) that can be evaluated for determining how the target operator 220 may be performing in comparison against a baseline 224. OPERATION 312 may further include benchmarking the target operator's KPIs against the OLM operators' KPIs and determining benchmarking results including differences in values between the KPIs of the target operator 220 and the OLM operators 226. As described above, the differences in values may be indicative of comparative performance, wherein target operator 220 KPI values that are lower than baseline 224 KPI values may indicate lower performance, target operator 220 KPI values that are higher than baseline 224 KPI values may indicate higher performance, and target operator 220 KPI values that are approximate to baseline 224 KPI values may indicate average performance. As discussed, the KPI values may be configurable/editable using the client application 104 to generate performance visualizations based on different criteria.

In some examples, one or more of OPERATIONS 306, 308, 310, and 312 can be collapsed and performed by an unsupervised learning algorithm. For example, the OLM profile 222 and the identification of clusters of OLM operators 226a-n may effectively be performed by an unsupervised machine learning algorithm using feature selection and principal component analysis to build the OLM profile operation values and identify clusters of OLM operators 226a-n for a given target operator 220. Among other things, the unsupervised machine learning algorithm can determine similarities between operators based on all information available in vehicle data server 208 rather than the discrete variables made available to define an OLM within the client application 104. As information about the target operator 220 and other operators is continuously received/updated in vehicle data server 208, such an unsupervised learning algorithm may be run continuously in the background, while visual display of results for a particular target operator 220 may be displayed only when requested.

At OPERATION 314, various visualizations representing the benchmarking results and anonymized data analyzed for determining the benchmarking results may be generated and included in a dashboard UI that may be provided to the client application 104 and displayed to the user/operator. For example, the various visualizations may represent the relative performance of the target operator 220 with respect to various transportation system efficiency determinants. Accordingly, based on the visualizations and data, the target operator 220 may be enabled to identify, in real-time or near real-time, insightful and actionable information that the target operator can make modifications for improving transportation system efficiency. For example, the visualizations and data may indicate underperforming vehicles 212, vehicle drivers who may need coaching/instruction, how the target operator 220 compares against other operators in a same category, and other insightful and actionable information.

At DECISION OPERATION 316, a determination may be made as to whether an indication of a user interaction with a visualization or data included in the dashboard UI is received. For example, various UI options may be included in the GUI 214 that enable the user to interact with various functions provided by the benchmarking engine 110. For example, the UI options may allow for a selection of OLM operators 226, a time range of the telematics data, a state or other geographical region in which the telemetry data are taken, whether a visualization is shown on a unique vehicle identifier number (VIN) basis or a model basis, and other options. If a user selection of a UI option is made, the method 300 may return to: OPERATION 306, where, based on the user selections, the OLM profile 222 may be redefined, and/or to OPERATION 308, where, based on the user selections, another subset of operators may be determined as OLM operators 226; and/or to OPERATION 310, where, based on the user selections, other telemetry data and vehicle configuration data may be retrieved; and/or to OPERATION 312, where, based on the user selections, the target operator's KPIs may be reevaluated against the OLM operators' KPIs and updated benchmark results may be determined; and/or to OPERATION 314, where, based on the user selections, dashboard visualizations may be updated to correspond with the user selections and/or updated benchmark results. If a user selection of a UI option is made, the method 300 may end at END OPERATION 398.

In some examples, the method 300 may proceed from OPERATION 312 to OPERATION 318, where a vehicle configuration for a target operator vehicle 212 may be determined based on benchmarking results. For example, based on a comparison of the target operator's KPIs against the OLM operators' KPIs, a vehicle configuration for the target operator vehicle 212 that may increase the target operator's KPI values may be determined. In one example, powertrain specification options (e.g., engine type, a hardware/software transmission type, and an axle ratio) of an OLM operator's vehicle 212 with KPI values that are higher than the target operator's KPI values may be determined as a vehicle configuration for the target operator 220. In another example, a determination that a target operator vehicle 212 does not have a latest software update may be used to determine a software update to automatically apply to the target operator vehicle 212.

At OPERATION 320, the vehicle configuration may be automatically provided to the provisioning system 118 or to the vehicle configuration update system 122, and at OPERATION 322, the manufacture or update of a target operator vehicle 212 may be automatically initiated according to the vehicle configuration. For example, the vehicle manufacturing system 120 or the vehicle configuration update system 122 may use the vehicle configuration to manufacture or update a vehicle 212 that is determined to positively impact the performance of the target operator. In examples, the manufacture or update of the vehicle 212 may be fully automated based on the vehicle configuration. The method 300 may end at OPERATION 398.

Figure 4:
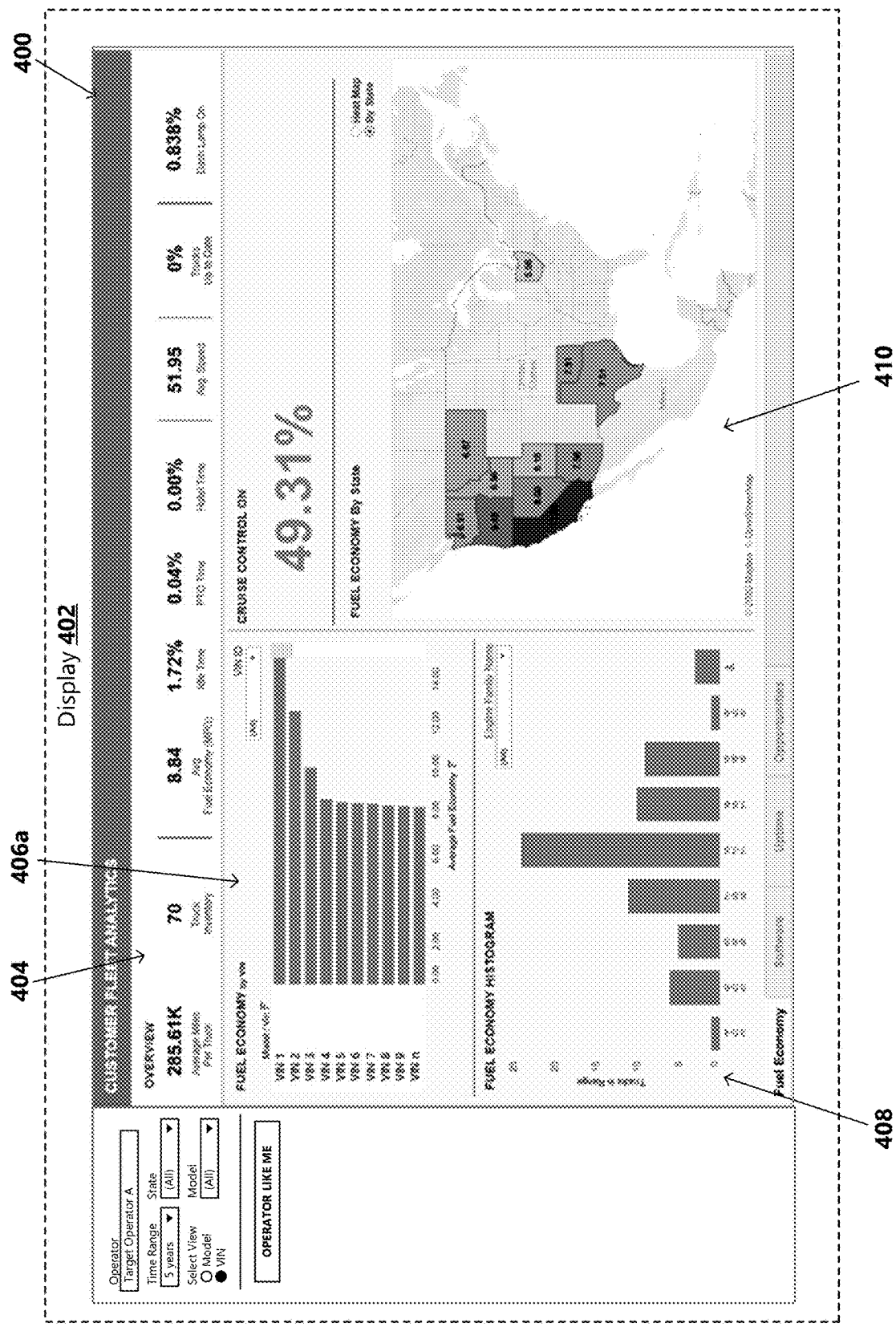
FIGS. 4-8 are illustrations of an example user interface visualizations generated by aspects of the present disclosure.
Figure 5:
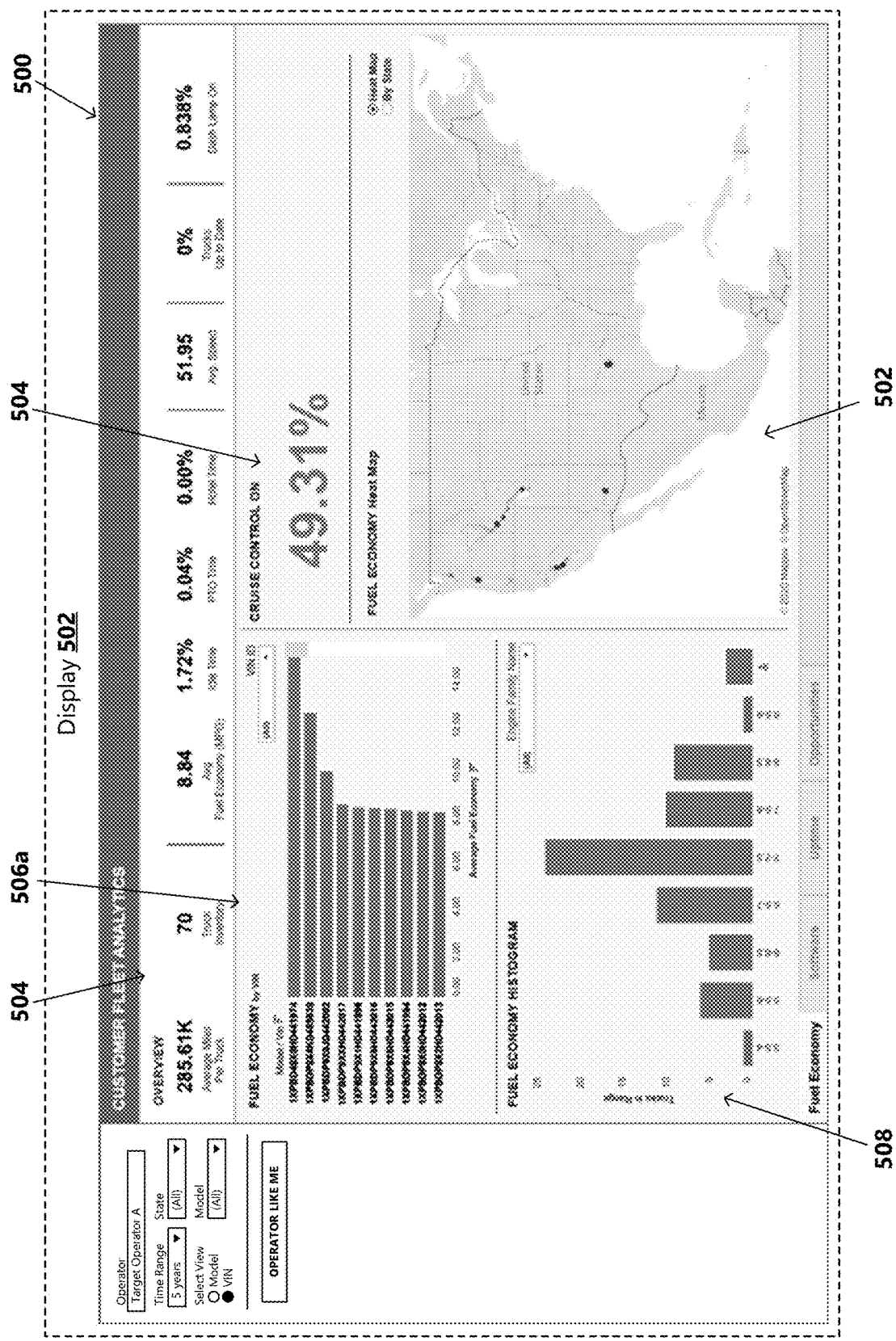
Figure 6:
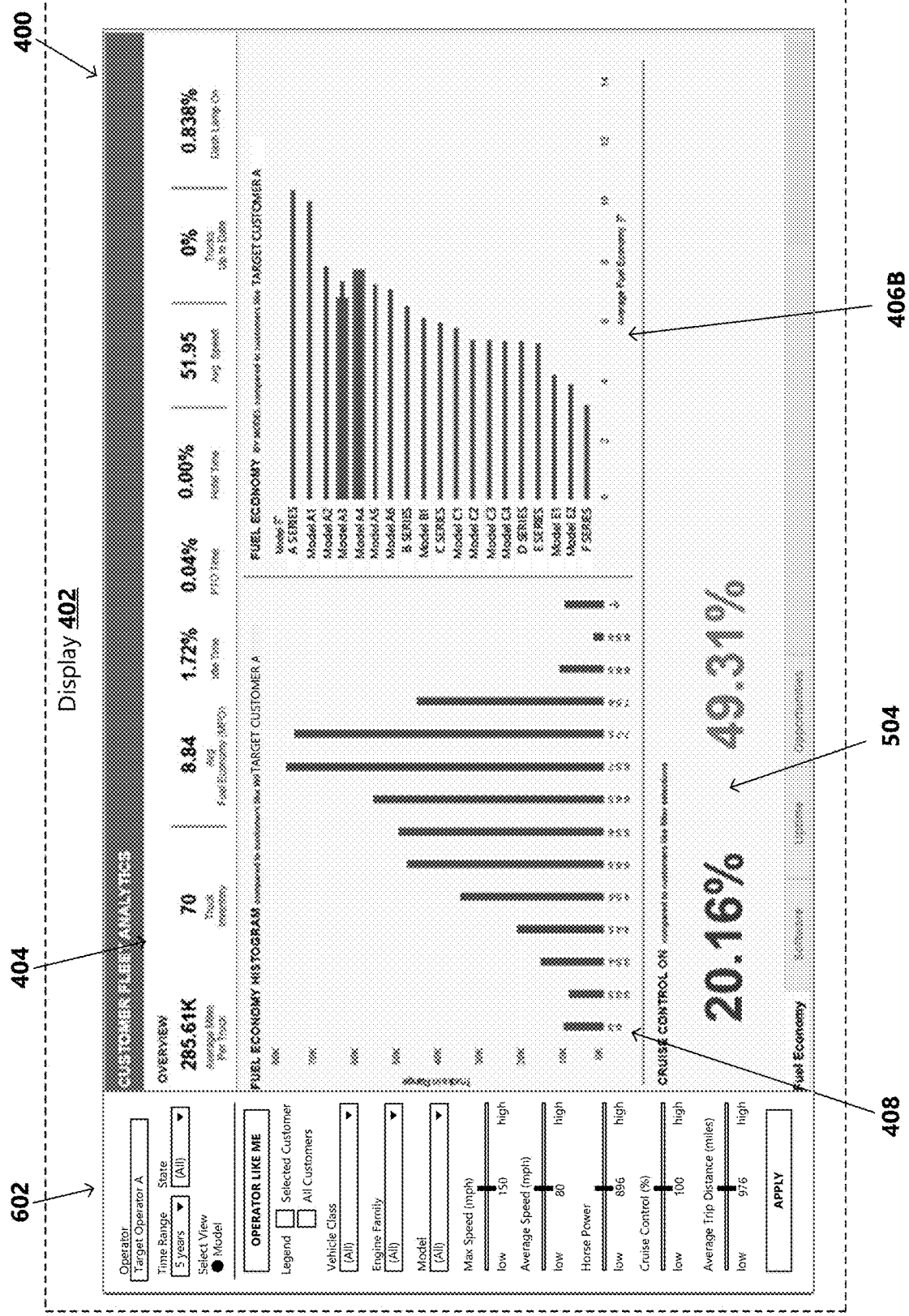

FIGS. 4-8 are illustrations of an example dashboard UIs 400 that may be generated and displayed on a display 402 to a user/target operator 220. In some examples and as shown in FIGS. 4-8, the example dashboard UI 400 may include overview metrics 404 associated with an overall health of an operator's fleet of vehicles 212. In some examples and as shown in FIGS. 4, 5, and 6, the example dashboard UI 400 may include a KPI by VIN/model visualization 406. For example, the KPI which the example visualization 406 may represent is fuel economy. In other examples, another KPI (e.g., software, uptime, other KPI) may be represented. In some examples, a visualization may be toggled between a VIN-based or model-based visualization. The KPI by VIN visualization 406*a* (FIGS. 4 and 5) shows a listing of target operator vehicle VINs and a visual representation of the average KPI dataset determined for each vehicle 212. The KPI by model visualization 406*b* (FIG. 6) shows a listing of models and a visual representation of the average KPI determined for each vehicle model type of the operator's vehicle fleet. In some examples and as shown in FIGS. 4, 55, and 6, the example dashboard UI 400 may include a KPI histogram visualization 408 used to visually represent a distribution of an average KPI determined per vehicle 212 across an operator's vehicle fleet. In some examples and as shown in FIG. 4, the example dashboard UI 400 may include a KPI map visualization 410 used to visually represent an average KPI determined across all vehicles 212 in an operator's fleet driven through a given state during a selected time period. In some examples and as shown in FIG. 5, the example dashboard UI 400 may include a KPI heat map visualization 502 using a heat map to visually represent a geographic region of where the operator operates. For example, darker regions or regions of a particular color may indicate more miles accumulated in that given region. In some examples and as shown in FIGS. 5 and 6, the example dashboard UI 400 may include cruise control metrics 504 associated with a percentage of the time cruise control is used. As should be appreciated, each of the example visualizations and metrics 404, 406, 408, 410, 502, 504 can visually represent other KPIs and can visually represent the same or other KPIs of the target operator 220 and/or of OLM operators 226. Additionally, other types of visualizations may be used to represent the KPIs and datasets.

In some examples and as shown in FIG. 6, a user selection to benchmark a target operator's performance against a baseline 224 for a KPI metric may result in a visual display of benchmark results. In some examples, a filter panel 602 may be included in the dashboard UI 400 where various filters for defining an OLM profile 222 and an associated operation value dataset. For example, UI tools may be provided for adjusting one or more operation values, such as values for vehicle class, vehicle engine family, vehicle model, maximum speed (miles per hour (MPH)), average speed (MPH), horsepower utilization, cruise control usage (%), average trip distance (miles), load profile, etc. In some examples and as shown in FIG. 6, a KPI histogram 408 may visually represent a distribution of a KPI per vehicle 212 for OLM operators 226 associated with a target operator 220. In some examples and as shown in FIG. 6, a KPI by model visualization 406*b* may include a visual representation of a distribution of an average KPI per model type for the target operator 220 compared to (e.g., overlaid on) a visual representation of a distribution of an average KPI per model of OLM operators 226.

Figure 7:
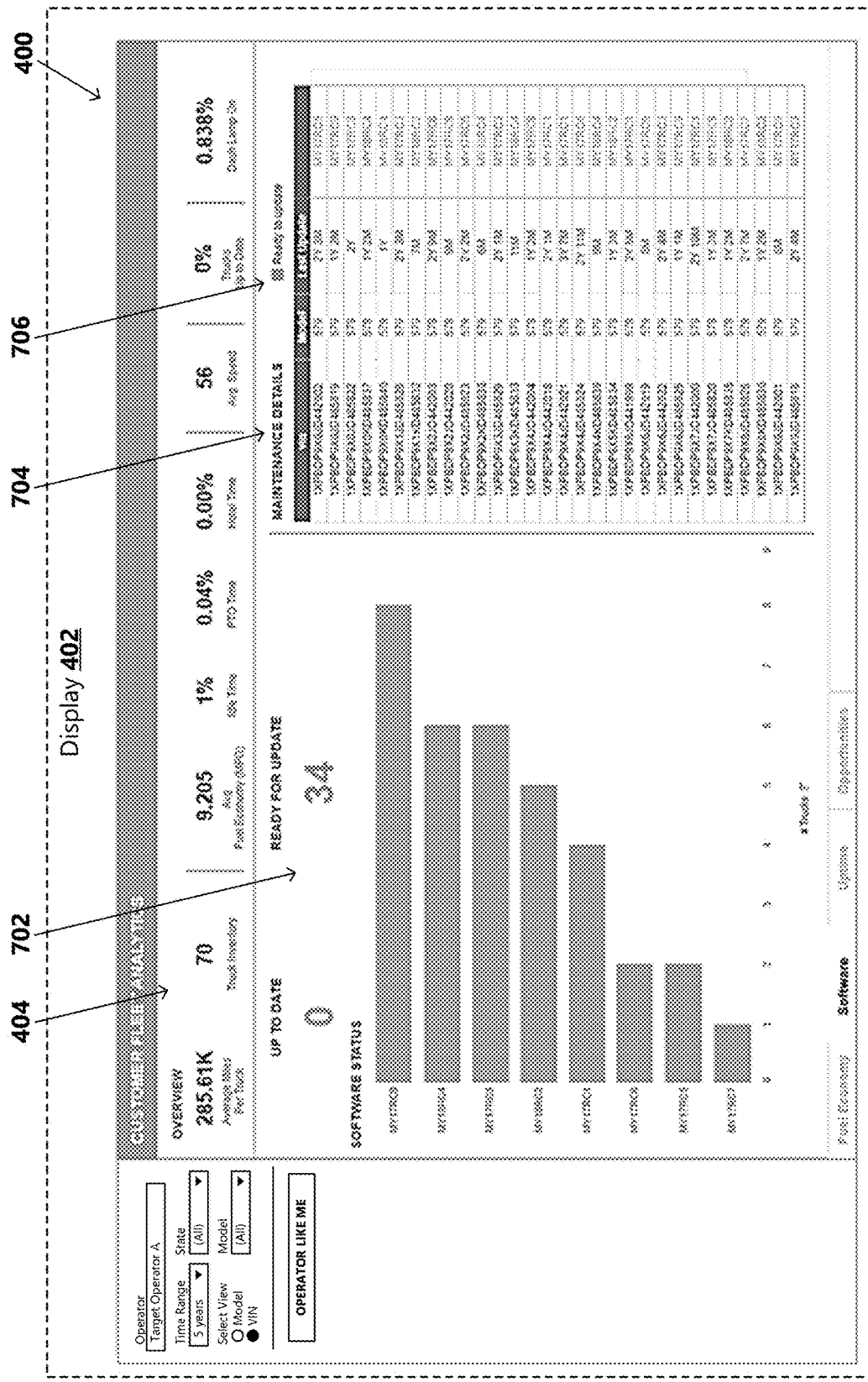

In some examples and as shown in FIG. 7, the example dashboard UI 400 may include software status KPI visualizations. For example, example software status KPI visualizations may include: a KPI histogram 702 to visually represent a distribution of software levels/versions for an operator's fleet of vehicles 212; a table 704 to visually represent, by VIN, each vehicle's current software level, when it was last updated, and whether it is a latest update; and an indicator 706 (e.g., shading, color, icon) to visually represent vehicles 212 that may need to be updated to new software.

Figure 8:
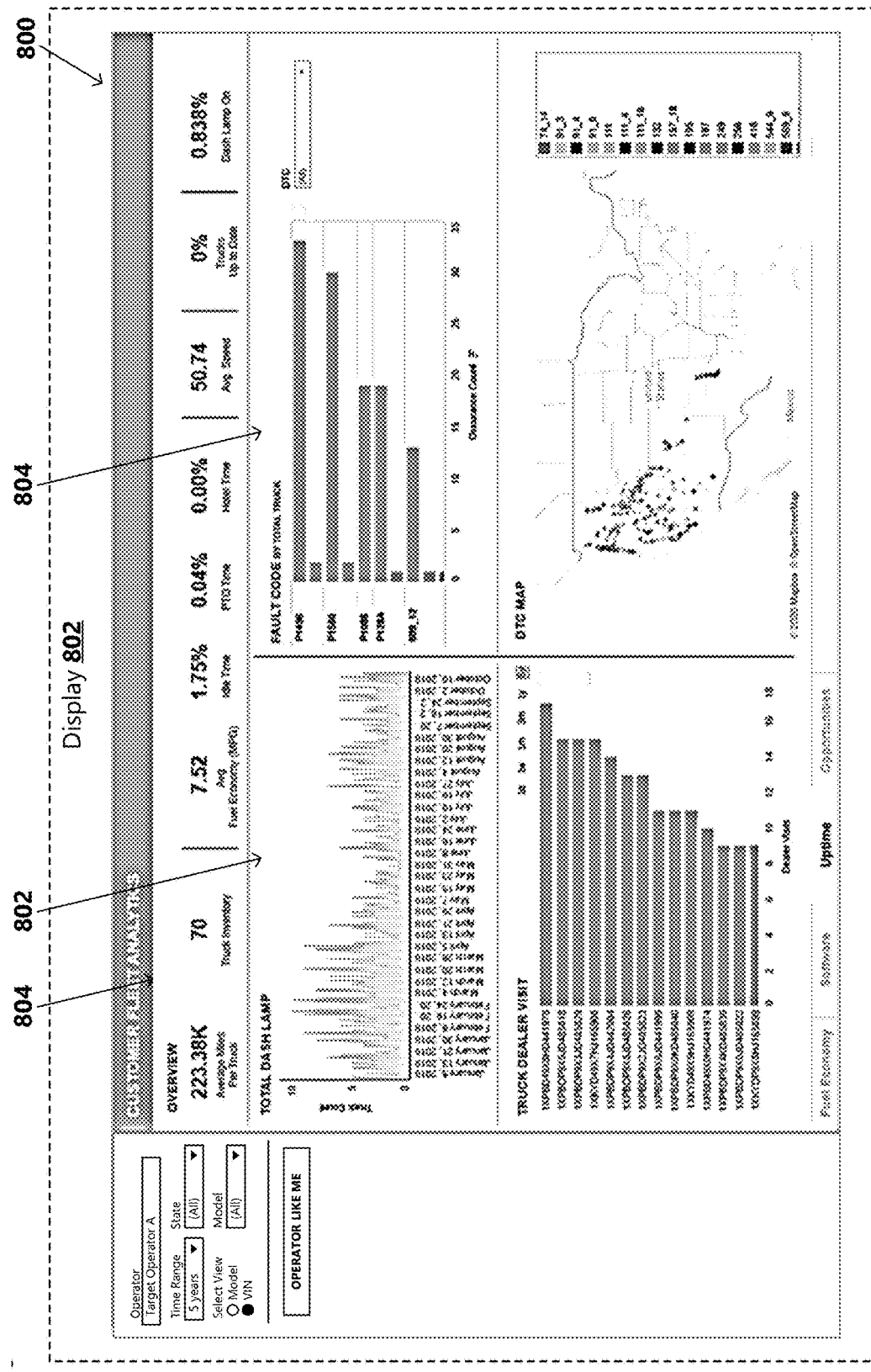

In some examples and as shown in FIG. 8, the example dashboard UI 400 may include uptime KPI visualizations for an operator's fleet. For example, example uptime KPI visualizations may include: a time series dash lamp plot 802 to visually represent a time-based visualization of a number of vehicles 212 that had a maintenance-related issue on the vehicle at a given time as represented by dash lamp data; a fault code histogram 804 to visually represent a distribution of unique fault codes related to maintenance issues; and a dealer visit visualization 806, such as a bar chart, to visually represent a number of dealer visits for each vehicle 212 by VIN, wherein vehicles with higher dealer visit numbers may indicate persistent issues with the vehicle. As should be appreciated, the above example UIs are intended to be exemplary and not limiting. Other types and configurations of visualizations are possible and are within the scope of the present disclosure.

Figure 9:
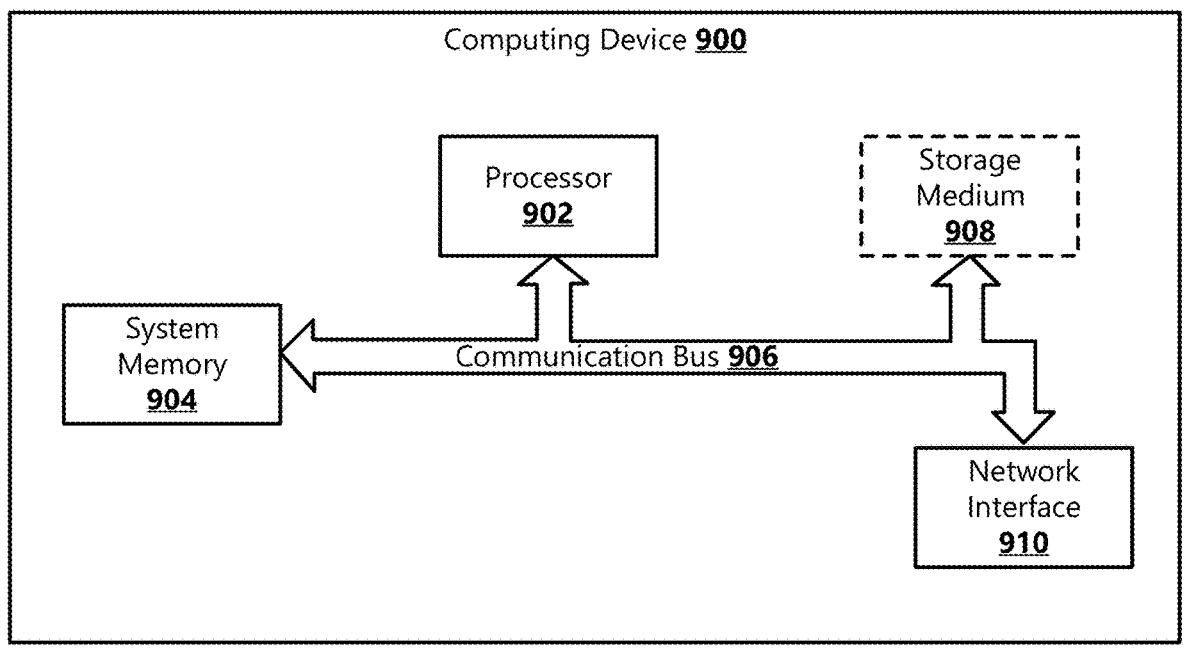
FIG. 9 is a block diagram illustrating example physical components of a computing device or system with which embodiments may be practiced.

FIG. 9 is a block diagram of an illustrative computing device 900 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 900 includes at least one processor 902 and a system memory 904 connected by a communication bus 906. Depending on the exact configuration and type of device, the system memory 904 may be volatile or nonvolatile memory, such as read-only memory ("ROM"), random access memory ("RAM"), EEPROM, flash memory, or other memory technology. Those of ordinary skill in the art and others will recognize that system memory 904 typically stores data or program modules that are immediately accessible to or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 9, the computing device 900 also includes a storage medium 908. However, services may be accessed using a computing device that does not include means for persisting data to a local storage medium. Therefore, the storage medium 908 depicted in FIG. 9 is optional. In any event, the storage medium 908 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data.

In this regard, the system memory 904 and storage medium 908 depicted in FIG. 9 are examples of computer-readable media.

For ease of illustration and because it is not important for an understanding of the claimed subject matter, FIG. 9 does not show some of the typical components of many computing devices. In this regard, the computing device 900 may include input devices, such as a keyboard, keypad, mouse, trackball, microphone, video camera, touchpad, touchscreen, electronic pen, stylus, or the like. Such input devices may be coupled to the computing device 900 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 900 (e.g., a client device), or can be integral components of the computing device 900. In some embodiments, multiple input devices may be combined into a single, multifunction input device (e.g., a video camera with an integrated microphone). The computing device 900 may also include output devices such as a display, speakers, printer, etc. The output devices may include video output devices such as a display or touchscreen. The output devices also may include audio output devices such as external speakers or earphones. The output devices can be separate from and communicatively coupled to the computing device 900, or can be integral components of the computing device 900. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A system for providing operator fleet performance benchmarking and analytics, the system comprising:
    at least one processor;
    a memory storage device including instructions that when executed by the at least one processor are configured to:
        obtain target operator vehicle configuration data and telemetry data associated with a target operator vehicle fleet, the target operator vehicle fleet including a plurality of vehicles;
        determine, based on the target operator vehicle configuration data and telemetry data, an operator-like-me profile including target operator operation values representing attributes of the target operator vehicle fleet, the operator-like-me profile being determined from analysis of operational data associated with a plurality of operator vehicle fleets including the target operator vehicle fleet;
        determine, based on the target operator operation values, a subset of operators satisfying criteria associated with the operator-like-me profile;
        obtain other operator vehicle configuration data and telemetry data associated with the subset of operators;
        anonymize the other operator vehicle configuration data and telemetry data;
        determine target operator key performance indicator values for the target operator vehicle fleet based on the target operator vehicle configuration data and telemetry data;
        determine other operator key performance indicator values for the subset of operators based on the vehicle configuration data and telemetry data associated with the subset of operators;
        benchmark the target operator vehicle fleet's performance using the other operator key performance indicator values as a baseline;
        generate visualizations that visually represent the target operator and other operator key performance indicator values and the results of the benchmark;
        determine a vehicle configuration for a target operator vehicle based on the results of the benchmark; and
        perform at least one of:
            automatically providing the selected vehicle configuration to a provisioning system to initiate manufacture of the target operator vehicle based on the vehicle configuration; or
            automatically providing the selected vehicle configuration to a vehicle configuration update system to update one or more vehicles of the target operator vehicle fleet based on the vehicle configuration.

2. The system of claim 1, wherein in determining the subset of operators satisfying criteria associated with the operator-like-me profile, the system is configured to, for each operator included in the subset of operators:
    determine other operator operation values representing attributes of the operator vehicle fleet; and
    determine the operator operation values are similar to the target operator operation values according to a threshold.

3. The system of claim 2, wherein the system comprises a machine learning algorithm trained to determine the operator-like-me profile.

4. The system of claim 2, wherein the system comprises a machine learning algorithm trained to determine the subset of operators satisfying criteria associated with the operator-like-me profile.

5. The system of claim 2, wherein the target operator and the other operator operation values include values representing attributes of at least one of:
    vehicle configuration;
    drive cycles; and
    duty cycles.

6. The system of claim 5, wherein the target operator and the other operator operation values include values representing attributes of at least one of:
    vehicle class;
    vehicle engine family;
    vehicle model;
    maximum speed;
    average speed;
    horsepower utilization;
    cruise control usage;
    average trip distance; and
    load profile.

7. The system of claim 1, wherein the target operator and the other operator key performance indicator values include transportation system efficiency determinant values.

8. The system of claim 7, wherein the target operator and the other operator key performance indicator values include at least one of:
    fuel economy;

software status;
uptime;
gradeability;
acceleration;
freight efficiency;
maintenance compliance; and
vehicle driver performance.

9. The system of claim 1, wherein the system is further configured to:
receive a request from a client application to initiate the benchmark; and
provide the visualizations visually representing the results of the benchmark to the client application for display in a graphical user interface.

10. The system of claim 9, wherein the system is further configured to receive one or more target operator selections from the client application adjusting one or more target operator operation values.

11. The system of claim 1, wherein the visualizations include at least one of:
overview metrics associated with an overall health of the target operator vehicle fleet;
fuel economy by vehicle identification number (VIN) or vehicle model;
a fuel economy histogram representing a distribution of average fuel economy per vehicle across the target operator vehicle fleet;
a fuel economy map representing average fuel economy measured across the target operator vehicle fleet;
a fuel economy heat map representing locations where the target operator vehicle fleet operates; and
cruise control usage metrics.

12. A method for providing operator fleet performance benchmarking and analytics, comprising:
obtaining target operator vehicle configuration data and telemetry data associated with a target operator vehicle fleet, the target operator vehicle fleet including a plurality of vehicles;
determining, based on the target operator vehicle configuration data and telemetry data, an operator-like-me profile including target operator operation values representing attributes of the target operator vehicle fleet, the operator-like-me profile being determined from analysis of operational data associated with a plurality of operator vehicle fleets including the target operator vehicle fleet;
determining, based on the target operator operation values, a subset of operators satisfying criteria associated with the operator-like-me profile;
obtaining other operator vehicle configuration data and telemetry data associated with the subset of operators;
anonymizing the other operator vehicle configuration data and telemetry data;
determining target operator key performance indicator values for the target operator vehicle fleet based on the target operator vehicle configuration data and telemetry data;
determining other operator key performance indicator values for the subset of operators based on the vehicle configuration data and telemetry data associated with the subset of operators;
benchmarking the target operator vehicle fleet's performance using the other operator key performance indicator values as a baseline;
generating visualizations that visually represent the target operator and other operator key performance indicator values and the results of the benchmark;
determining a vehicle configuration for a target operator vehicle based on the results of the benchmark; and
perform at least one of
automatically providing the selected vehicle configuration to a provisioning system to initiate manufacture of the target operator vehicle based on the vehicle configuration; or
automatically providing the selected vehicle configuration to a vehicle configuration update system to update one or more vehicles of the target operator vehicle fleet based on the vehicle configuration.

13. The method of claim 12, wherein determining the subset of operators satisfying criteria associated with the operator-like-me profile comprises, for each operator included in the subset of operators:
determining other operator operation values representing attributes of the operator vehicle fleet; and
determining the operator operation values are similar to the target operator operation values according to a threshold.

14. The method of claim 12, wherein determining the target operator key performance indicator values and the other operator key performance indicator values include determining transportation system efficiency determinant values.

15. The method of claim 12, further comprising:
receiving a request from a client application to initiate the benchmark; and
providing the visualizations visually representing the results of the benchmark to the client application for display in a graphical user interface.

16. The method of claim 12, further comprising receiving one or more target operator selections from the client application adjusting one or more target operator operation values.

17. A computer readable storage device configured to store computer readable instructions, which when executed by a processor, are configured to:
receive a request from a client application to initiate a benchmark a target operator vehicle fleet's performance against a baseline;
obtain target operator vehicle configuration data and telemetry data associated with the target operator vehicle fleet, the target operator vehicle fleet including a plurality of vehicles;
determine, based on the target operator vehicle configuration data and telemetry data, an operator-like-me profile including target operator operation values representing attributes of the target operator vehicle fleet, the operator-like-me profile being determined from analysis of operational data associated with a plurality of operator vehicle fleets including the target operator vehicle fleet;
determine, based on the target operator operation values, a subset of operators satisfying criteria associated with the operator-like-me profile;
obtain other operator vehicle configuration data and telemetry data associated with the subset of operators;
anonymize the other operator vehicle configuration data and telemetry data;
determine target operator key performance indicator values for the target operator vehicle fleet based on the target operator vehicle configuration data and telemetry data;

determine other operator key performance indicator values for the subset of operators based on the vehicle configuration data and telemetry data associated with the subset of operators;
benchmark the target operator vehicle fleet's performance using the other operator key performance indicator values as the baseline;
generate visualizations that visually represent the target operator and other operator key performance indicator values and the results of the benchmark;
provide the visualizations to the client application for display in a graphical user interface;
determine a vehicle configuration for a target operator vehicle based on the results of the benchmark; and
perform at least one of:
   automatically provide the selected vehicle configuration to a provisioning system to initiate manufacture of the target operator vehicle based on the vehicle configuration; or
   automatically provide the selected vehicle configuration to a vehicle configuration update system to update one or more vehicles of the target operator vehicle fleet based on the vehicle configuration.

18. The computer readable storage device of claim 17, wherein in determining the subset of operators satisfying criteria associated with the operator-like-me profile, the system is configured to, for each operator included in the subset of operators:
   determine other operator operation values representing attributes of the operator vehicle fleet; and
   determine the operator operation values are similar to the target operator operation values according to a threshold.

19. The computer readable storage device of claim 18, wherein the target operator and the other operator operation values include values representing attributes of at least one of:
   vehicle class;
   vehicle engine family;
   vehicle model;
   maximum speed;
   average speed;
   horsepower utilization;
   cruise control usage;
   average trip distance; and
   load profile.

\* \* \* \* \*